United States Patent
Oguz et al.

(10) Patent No.: US 10,481,786 B2
(45) Date of Patent: Nov. 19, 2019

(54) USER INTERFACE FOR ENABLING ACCESS TO DATA OF A MOBILE DEVICE

(71) Applicant: QUALCOMM Incorporated, San Diego, CA (US)

(72) Inventors: Seyfullah Halit Oguz, San Diego, CA (US); Khaled Helmi El-Maleh, San Marcos, CA (US); Saurabh Sensharma, Hyderabad (IN); Arvind Kulathu Ramachandran, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 14/996,943

(22) Filed: Jan. 15, 2016

(65) Prior Publication Data
US 2017/0205983 A1    Jul. 20, 2017

(51) Int. Cl.
*G06F 3/0488* (2013.01)
*G06T 11/00* (2006.01)
*G06F 21/32* (2013.01)
*G06F 21/62* (2013.01)
*G06F 3/01* (2006.01)
*G06F 21/36* (2013.01)
*H04L 29/06* (2006.01)

(52) U.S. Cl.
CPC ........... *G06F 3/0488* (2013.01); *G06F 3/013* (2013.01); *G06F 21/32* (2013.01); *G06F 21/36* (2013.01); *G06F 21/6218* (2013.01); *G06T 11/001* (2013.01); *H04L 63/0861* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 6,530,024 B1 | 3/2003 | Proctor | |
| 6,549,194 B1 | 4/2003 | McIntyre et al. | |
| 7,231,657 B2 | 6/2007 | Honarvar et al. | |
| 8,594,374 B1 * | 11/2013 | Bozarth | G06F 21/36 382/103 |
| 8,625,847 B2 | 1/2014 | Pasquero | |

(Continued)

FOREIGN PATENT DOCUMENTS

EP    2503479 A1    9/2012

OTHER PUBLICATIONS

Anonymous: "Galaxy A5—How do I set up a Lock Screen Pattern on my Samsung Galaxy A5?", Dec. 3, 2015 (Dec. 3, 2015), XP855341553, pp. 1-6. Retrieved from the Internet: URL:http://www.samsung.com/ca/support/skp/faq/1096251 [retrieved on Feb. 2, 2017].

(Continued)

*Primary Examiner* — Christopher J Fibbi
(74) *Attorney, Agent, or Firm* — Toler Law Group, PC

(57) ABSTRACT

A method for generating a user interface at a mobile device includes receiving an indication of a user configurable pattern at a processor. The user configurable pattern indicates locations on a user interface that are spatially separated. The locations are configured to receive user input to enable access to data at the mobile device. The method also includes generating the user interface based on the user configurable pattern.

30 Claims, 11 Drawing Sheets

(56) References Cited

U.S. PATENT DOCUMENTS

| | | | |
|---|---|---|---|
| 8,869,261 B1* | 10/2014 | Carter | G06F 21/36 455/410 |
| 8,897,500 B2 | 11/2014 | Syrdal et al. | |
| 8,988,349 B2 | 3/2015 | Alberth et al. | |
| 9,104,886 B1* | 8/2015 | Dolbakian | G06F 21/62 |
| 2007/0089164 A1 | 4/2007 | Gao et al. | |
| 2010/0235768 A1 | 9/2010 | Agevik et al. | |
| 2011/0252344 A1* | 10/2011 | van Os | G06F 9/4443 715/763 |
| 2013/0187773 A1 | 7/2013 | Tsou | |
| 2013/0229367 A1 | 9/2013 | Pinch | |
| 2014/0020091 A1 | 1/2014 | Pasquero | |
| 2014/0043243 A1* | 2/2014 | Methenitis | G06F 21/31 345/173 |
| 2014/0126782 A1 | 5/2014 | Takai et al. | |
| 2014/0226131 A1* | 8/2014 | Lopez | G06F 1/1626 351/210 |
| 2014/0289833 A1 | 9/2014 | Briceno et al. | |
| 2014/0289834 A1 | 9/2014 | Lindemann | |
| 2014/0331315 A1 | 11/2014 | Birk et al. | |
| 2015/0058812 A1 | 2/2015 | Lindh et al. | |
| 2015/0156803 A1 | 6/2015 | Ballard et al. | |
| 2015/0161434 A1* | 6/2015 | Ross | G06K 9/00288 382/118 |
| 2015/0264567 A1 | 9/2015 | Sensharma et al. | |
| 2015/0339470 A1 | 11/2015 | Bates et al. | |
| 2016/0019420 A1 | 1/2016 | Feng et al. | |
| 2016/0019421 A1 | 1/2016 | Feng et al. | |
| 2016/0026862 A1* | 1/2016 | Anderson | H04N 5/23229 382/117 |
| 2016/0085949 A1* | 3/2016 | Peterson | G06F 21/32 726/19 |
| 2017/0091550 A1 | 3/2017 | Feng | |
| 2017/0109035 A1* | 4/2017 | Agarwal | G06F 3/0481 |
| 2017/0116404 A1 | 4/2017 | Birk et al. | |
| 2017/0161976 A1 | 6/2017 | Tsou | |
| 2017/0206343 A1 | 7/2017 | Oguz et al. | |
| 2017/0206400 A1 | 7/2017 | Tsou | |
| 2017/0212586 A1 | 7/2017 | Lopez et al. | |
| 2017/0236101 A1 | 8/2017 | Irudayam et al. | |
| 2018/0008161 A1* | 1/2018 | Shin | A61B 5/0476 |

OTHER PUBLICATIONS

International Search Report and Written Opinion—PCT/US2016/064820—ISA/EPO—dated Feb. 13, 2017.

"Sensory Introduces Combined Voice and Vision Biometric Authentication for Mobile Phones, Tablets and PCs", Korea Bizwire in Computer and Software, Internet and Software, Retrieved from internet on Oct. 18, 2017, http://koreabizwire.com/sensory-introduces-combined-voice-and-vision-biometric-authen, pp. 1-6.

Dimaj, "Unlock your Device using Random Slider," retrieved from <<http://blog.dimaj.net/content/unlock-your-device-using-random-slider>>, Aug. 6, 2014, dimaj.net, 4 pages.

Mahdi, A., "Faces: Add Images to Each of the Lock Screen Passcode Keys," retrieved from <<http://www.downloadblog.com/2014/09/14/faces-images-lock-screen-passcode/>>, Sep. 14, 2014, iDownloadBlog, 8 pages.

* cited by examiner

USER INTERFACE FOR ENABLING ACCESS TO DATA OF A MOBILE DEVICE

I. FIELD

The present disclosure is generally related to a user interface for a mobile device.

II. DESCRIPTION OF RELATED ART

Advances in technology have resulted in smaller and more powerful computing devices. For example, a variety of portable personal computing devices, including wireless telephones such as mobile and smart phones, tablets, and laptop computers, are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Personal information of a user (and other secure information) may be stored at a mobile device. To protect the personal information from unauthorized access, the mobile device may require a person attempting to access data stored at the mobile device to provide authentication using a user interface. As non-limiting examples, a person attempting to access data stored at the mobile device may be required to provide one or more of a password, a personal identification number (PIN), a fingerprint for scanning, a voice sample for voice analysis, or other biometric features (e.g., facial features, iris scan, etc.).

However, the above-identified authentication techniques may be subject to security breaches. For example, a password may be entered by an unauthorized third-party attempting to access the data stored at the mobile device, a fingerprint may be "lifted" and used by a third-party attempting to access the data stored at the mobile device, and biometric features (e.g., voice samples, facial features, etc.) may be relatively easy to "spoof." To illustrate, an unauthorized third-party may use biometric features of an authorized user from other sources (e.g., a picture or recorded video of the authorized user) to access the data stored at the mobile device. Thus, unauthorized users may be able to "manipulate" current techniques for authenticating a user's identity to access data stored at the mobile device.

Additionally, the user interface that is operable to receive the authentication may have a "standard" design (or pattern). For example, the design of the user interface may not be desirable or customized with respect to the user of the mobile device.

III. SUMMARY

According to an exemplary implementation of the techniques described herein, a method for generating a user interface at a mobile device includes receiving an indication of a user configurable pattern at a processor. The user configurable pattern indicates locations on a user interface that are spatially separated. The locations are configured to receive user input to enable access to data at the mobile device. The method also includes generating the user interface based on the user configurable pattern.

According to another implementation of the techniques described herein, an apparatus includes a memory and a processor coupled to the memory. The processor is configured to receive an indication of a user configurable pattern. The user configurable pattern indicates locations on a user interface that are spatially separated. The locations are configured to receive user input to enable access to data at the mobile device. The processor is also configured to generate the user interface based on the user configurable pattern.

According to another implementation of the techniques described herein, a non-transitory computer-readable includes instructions for generating a user interface at a mobile device. The instructions, when executed by a processor, cause the processor to perform operations including receiving an indication of a user configurable pattern. The user configurable pattern indicates locations on a user interface that are spatially separated. The locations are configured to receive user input to enable access to data at the mobile device. The operations also include generating the user interface based on the user configurable pattern.

According to another implementation of the techniques described herein, an apparatus includes means for receiving an indication of a user configurable pattern. The user configurable pattern indicates locations on a user interface that are spatially separated. The locations are configured to receive user input to enable access to data at the mobile device. The apparatus also includes means for generating the user interface based on the user configurable pattern.

According to another implementation of the techniques described herein, a method for operating a mobile device includes generating a user interface at a processor. The user interface includes one or more virtual objects. The method also includes changing a configuration of the one or more virtual objects. The method further includes monitoring a mannerism of a user of the mobile device. The mannerism is affected by a change in configuration of the one or more virtual objects. The method also includes performing a function based on the mannerism.

According to another implementation of the techniques described herein, an apparatus includes a memory and a processor coupled to the memory. The processor is configured to generate a user interface. The user interface includes one or more virtual objects. The processor is also configured to change a configuration of the one or more virtual objects. The processor is further configured to monitor a mannerism of a user of the mobile device. The mannerism is affected by a change in configuration of the one or more virtual objects. The processor is also configured to perform a function based on the mannerism.

According to another implementation of the techniques described herein, a non-transitory computer-readable medium includes instructions for operating a mobile device. The instructions, when executed by a processor, cause the processor to perform operations including generating a user interface. The user interface includes one or more virtual objects. The method also includes changing a configuration of the one or more virtual objects. The method further includes monitoring a mannerism of a user of the mobile device. The mannerism is affected by a change in configuration of the one or more virtual objects. The method also includes performing a function based on the mannerism.

According to another implementation of the techniques described herein, an apparatus includes means for generating a user interface. The user interface includes one or more virtual objects. The apparatus also includes means for changing a configuration of the one or more virtual objects.

The apparatus further includes means for monitoring a mannerism of a user of a mobile device. The mannerism is affected by a change in configuration of the one or more virtual objects. The apparatus also includes means for performing a function based on the mannerism.

IV. BRIEF DESCRIPTION OF THE DRAWINGS

V. DETAILED DESCRIPTION

Techniques for authenticating a user identity using a mannerism of a user are disclosed. A mobile device may generate a user interface that is operable to receive an input from a user. As a non-limiting example, the input may include a personal identification number (PIN) that is entered into the user interface to enable access to data stored at the mobile device. The user may enter a first digit of the PIN and a sensor at the mobile device may detect a mannerism of the user when the user enters the first digit. As a non-limiting example, the sensor may be a "front-facing" camera configured to monitor pupil movement and/or eye gaze of the user when the user enters the first digit. After entering the first digit, a configuration of the user interface may change. For example, the location of numerical digits (e.g., keys) in the user interface may change after first digit is entered. According to an exemplary implementation, the location of the numerical digits in the user interface may randomly change. When the user enters a second digit of the PIN, the sensor may monitor the mannerism (e.g., the change in pupil movement and/or eye gaze due to the user's eye(s) searching for and/or locating the second digit, whose position has been changed). Each time the user enters a different digit of the PIN, the configuration of the user interface may change. The resulting change in the user interface configuration may affect an orientation of the user's eye gaze. Thus, the mannerism may be affected by the configuration of the user interface and the input provided to the user interface.

The processor may authenticate the user identity based on the input and the mannerism. For example, if the PIN is correctly entered and the orientation of the user's eye gaze changes accordingly after each digit of the PIN is entered, the processor may enable the user to access data stored at the mobile device. It is to be understood that in other examples, inputs other than a PIN and mannerisms other than pupil movement/eye gaze may be used in conjunction with the techniques of the present disclosure.

One particular advantage provided by at least one of the disclosed techniques is an ability to reduce security breaches at a mobile device. For example, monitoring a mannerism while an authentication input is provided to a user interface may reduce the likelihood that a third-party may successfully use "spoofing" (e.g., a picture or video of an authorized user) to gain access to data stored at the mobile device. Other aspects, advantages, and features of the present disclosure will become apparent after review of the entire application.

Particular implementations of the present disclosure are described with reference to the drawings. In the description, common features are designated by common reference numbers throughout the drawings.

Figure 1:
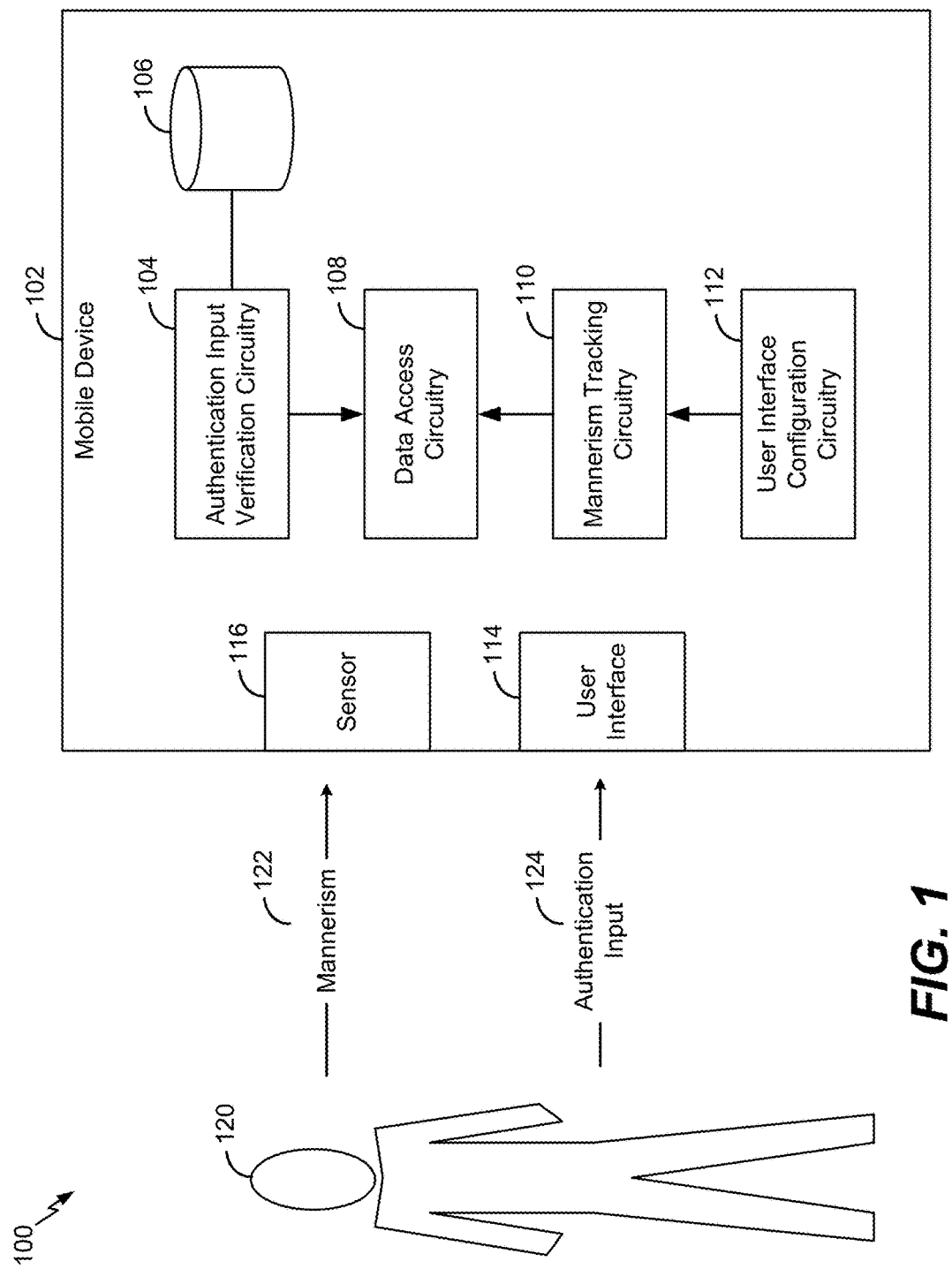
FIG. 1 illustrates a system that is operable to monitor a mannerism of a user at a mobile device.

Referring to FIG. 1, a system 100 that is operable to monitor a mannerism of a user at a mobile device is shown. As used herein, a "mannerism" of the user may also be referred to as a "live mannerism" or a mannerism that is detected in "real-time". The system 100 includes a mobile device 102 that is operable to detect a mannerism 122 from a user 120 and operable to receive an authentication input 124 from the user 124. As described below, the mannerism 122 and the authentication input 124 may be used to verify an identity of the user 120. Upon verification of the user's identity, the mobile device 102 may grant the user 120 access to data stored within the mobile device 102. The mobile device 102 includes an authentication input verification circuitry 104, a database 106, a data access circuitry 108, a mannerism tracking circuitry 110, a user interface configuration circuitry 112, a user interface 114, and a sensor 116.

During operation, the user 120 may provide the authentication input 124 to the user interface 114. As described in greater detail with respect to FIGS. 2-11, the authentication input 124 may include a personal identification number (PIN), a passcode, or a secure token. For ease of illustration, the authentication input 124 is described as a PIN with respect to FIG. 1. According to one implementation, the PIN may be stored in the database 106. After the user 120 enters each digit of the PIN, the user interface configuration circuitry 112 may change a configuration of one or more virtual objects (e.g., input keys) on the user interface 114, as described in greater detail with respect to FIG. 2. Additionally, the sensor 116 may detect the mannerism 122 of the user 120 as the user 124 is providing the authentication input 124 to the user interface 114, as described in greater detail with respect to FIG. 2. According to another implementation, the sensor 116 may be configured to detect the mannerism 122 of the user 120 after the user 124 provides the authentication input 124 to the user interface 114. The mannerism 122 may include an eye gaze of the user 120, pupil movement of the user 120, lip movement of the user 120, etc.

The mannerism tracking circuitry 110 may be configured to track and/or monitor the mannerism 122 detected by the sensor 116. If the mannerism tracking circuitry 110 determines that that the mannerism 122 correlates to the change in configuration of virtual objects and if the authentication input verification circuitry 104 determines that the authentication input 124 matches the PIN stored in the database 106, the data access circuitry 108 may verify the user's identify and may grant the user 120 access to data stored at the mobile device 102. Additional details regarding the verification process using the mannerism 122 are provided with respect to FIGS. 2-11.

Figure 2:
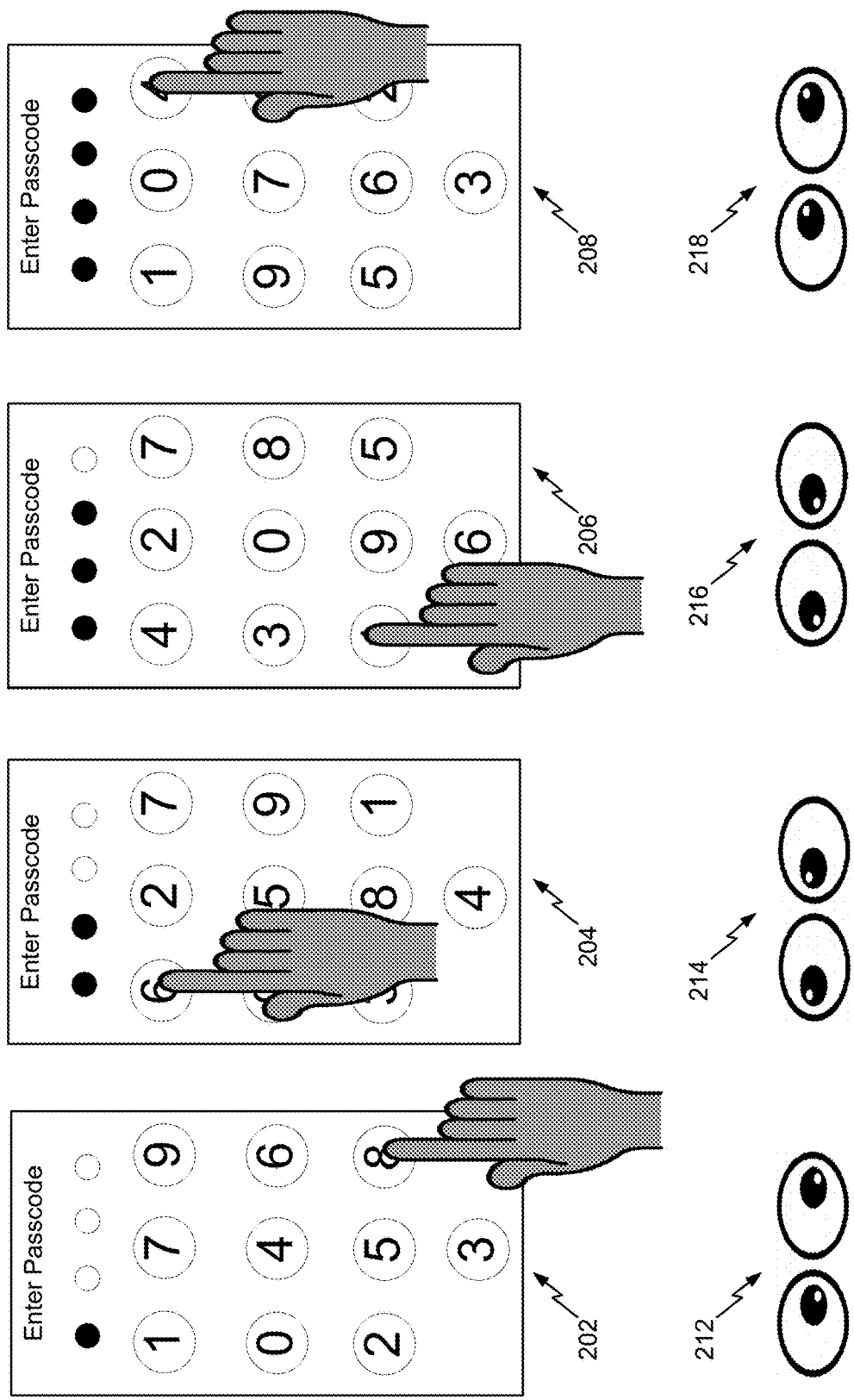
FIG. 2 illustrates a technique for authenticating a user identity at a mobile device using a mannerism of a user.

Referring to FIG. 2, a technique for authenticating a user identity at a mobile device using a mannerism of a user is shown. In accordance with the described techniques, a processor of a mobile device may generate a user interface that is operable to receive an input from a user of the mobile device. According to FIG. 2, the user interface may, at particular times, have a first configuration 202, a second configuration 204, a third configuration 206, or a fourth configuration 208. It should be understood that the configurations 202-208 illustrated in FIG. 2 are merely non-limiting examples and other configurations may be used in conjunction with the techniques described herein.

According to FIG. 2, the user may use the user interface to enter a personal identification number (PIN) (e.g., "8614") as an authentication input to access data stored at the mobile device. Although a PIN is illustrated as the authentication input in FIG. 2, in other implementations, a password or a secure token may also be entered as an authentication input.

The user may enter the first digit (e.g., "8") of the PIN when the user interface has the first configuration 202. According to the first configuration 202, input key "1" may be at a first location (e.g., the top-left location), input key "7" may be at a second location (e.g., the top-center location), input key "9" may be at a third location (e.g., the top-right location), input key "0" may be at a fourth location (e.g., the middle-left location), input key "4" may be at a fifth location (e.g., the middle-center location), input key "6" may be at a sixth location (e.g., the middle-right location), input key "2" may be at a seventh location (e.g., the bottom-left location), input key "5" may be at an eighth location (e.g., the bottom-center location), input key "8" may be at a ninth location (e.g., the bottom-right location), and input key "3" may be at a tenth location. When the user enters the first digit of the PIN, a sensor at the mobile device may detect a mannerism of the user. According to FIG. 2, the sensor may monitor the pupil movement of the user when the user enters the first digit of the PIN. For example, the sensor may detect the user's pupils move to the lower right, at 212, when the user enters the first digit of the PIN. Because the first digit (e.g., input key "8") is located at the ninth location, the processor may determine that the orientation of the user's pupils correlate to the location of the first digit. Each input key may be a virtual object included in the user interface. For ease of description, the mannerism is described as the pupil movement of the user. However, in other implementations, the mannerism may include an eye gaze of the user or lip movement of the user.

After entering the first digit of the PIN, the configuration of the user interface may change to the second configuration 204. For example, the location of the input keys in the user interface may randomly change after the first digit of the PIN is entered. To illustrate, input key "6" may be at the first location, input key "2" may be at the second location, input key "7" may be at the third location, input key "0" may be at the fourth location, input key "5" may be at the fifth location, input key "9" may be at the sixth location, input key "3" may be at the seventh location, input key "8" may be at the eighth location, input key "1" may be at the ninth location, and input key "4" may be at the tenth location. When the user enters the second digit (e.g., "6") of the PIN, the sensor at the mobile device may monitor (e.g., detect and/or track) the mannerism of the user. For example, the sensor may detect the user's pupils move to the upper right, at 214, when the user enters the second digit of the PIN. Because the second digit (e.g., input key "6") is located at the first location, the processor may determine that the orientation of the user's pupils correlate to the location of the second digit.

After entering the second digit of the PIN, the configuration of the user interface may change to the third configuration 206. For example, the location of the input keys in the user interface may randomly change after the second digit of the PIN is entered. To illustrate, input key "4" may be at the first location, input key "2" may be at the second location, input key "7" may be at the third location, input key "3" may be at the fourth location, input key "0" may be at the fifth location, input key "8" may be at the sixth location, input key "1" may be at the seventh location, input key "9" may be at the eighth location, input key "5" may be at the ninth location, and input key "6" may be at the tenth location. When the user enters the third digit (e.g., "1") of the PIN, the sensor at the mobile device may monitor (e.g., detect and/or track) the mannerism of the user. For example, the sensor may detect the user's pupils move to the lower right, at 216, when the user enters the third digit of the PIN. Because the third digit (e.g., input key "1") is located at the seventh location, the processor may determine that the orientation of the user's pupils correlate to the location of the third digit.

After entering the third digit of the PIN, the configuration of the user interface may change to the fourth configuration 208. For example, the location of the input keys in the user interface may randomly change after the third digit of the PIN is entered. To illustrate, input key "1" may be at the first location, input key "0" may be at the second location, input key "4" may be at the third location, input key "9" may be at the fourth location, input key "7" may be at the fifth location, input key "8" may be at the sixth location, input key "5" may be at the seventh location, input key "6" may be at the eighth location, input key "2" may be at the ninth location, and input key "3" may be at the tenth location. When the user enters the fourth digit (e.g., "4") of the PIN, the sensor at the mobile device may monitor (e.g., detect and/or track) the mannerism of the user. For example, the sensor may detect the user's pupils move to the upper right, at 218, when the user enters the fourth digit of the PIN. Because the fourth digit (e.g., input key "4") is located at the third location, the processor may determine that the orientation of the user's pupils correlate to the location of the fourth digit.

Thus, each time the user enters a different digit of the PIN, the configuration of the user interface may change. The resulting change in the user interface configuration may "affect" the user's pupil movement when entering the next digit of the PIN. Thus, the mannerism (e.g., the user's pupil movement) may be affected by each change in configuration of the interface and by the input (e.g., the PIN) provided to the user interface. The processor may authenticate the user identity based on the input and the mannerism. For example, if the PIN is correctly entered and the orientation of the user's pupils changes accordingly after each digit of the PIN is entered, the processor may allow the user to access data stored at the mobile device.

The techniques described with respect to FIG. 2 may reduce security breaches at the mobile device. For example, if the user interface requires the user to provide a biometric feature, such as a depiction of the user's face, the techniques of FIG. 2 may prevent an unauthorized third party that knows the PIN to use a "spoof" (e.g., a picture or video of an authorized user) to gain access to data stored at the mobile device. For example, mannerism (e.g., pupil movement) monitoring may prevent an unauthorized third party from placing video (or a picture) of an authorized user to the user interface while entering the PIN because the orientation of the user's pupils in the video may not correlate to the location of the digits as the digits are being entered.

Figure 3:
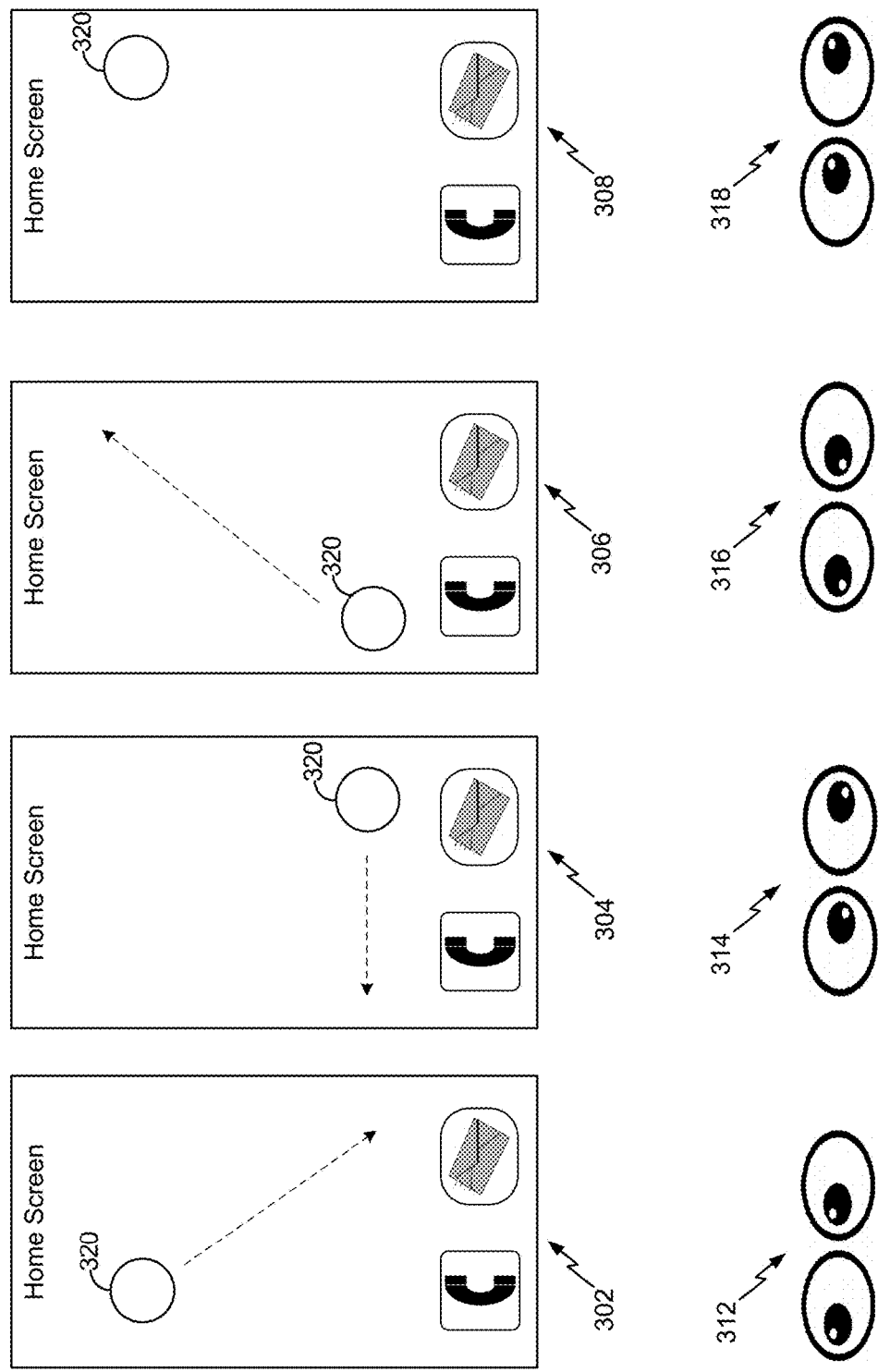
FIG. 3 illustrates a technique for conserving power at a mobile device using a mannerism of a user.

Referring to FIG. 3, a technique for conserving power at a mobile device using a mannerism of the user is shown. A processor may generate a user interface. In FIG. 3, the user interface is a "home screen" with an option to dial a number or send a short message service (SMS) message. It should be understood that the power savings techniques described herein may work in conjunction with a multitude of user interface screens and should not be limited to the home screen.

According to FIG. 3, the user interface may have a first configuration 302, a second configuration 304, a third configuration 306, and a fourth configuration 308. It should be understood that the configurations 302-308 illustrated in FIG. 3 are merely non-limiting examples and other configurations may be used in conjunction with the techniques described herein.

In the first configuration 302, a virtual object 320 may be in a first location (e.g., an upper-left corner) of the user interface. The virtual object 320 may become visible on the user interface after a prolonged period of user inaction. For example, if the user has failed to touch the user interface for a particular period of time, the virtual object 320 may become visible on the user interface. Although a single virtual object 320 is illustrated in the user interface, in other implementations, one or more virtual objects may become visible on the user interface after a prolonged period of user inaction.

As described above, the virtual object 320 may in the first location of the user interface in the first configuration 302. A sensor at the mobile device may detect a mannerism of the user when the virtual object 320 becomes visible on the user interface. As a non-limiting example, the sensor may monitor pupil movement of the user when the virtual object 320 becomes visible on the user interface. According to FIG. 3, the sensor may detect the user's pupils move to the upper-left, at 312, when the virtual object 320 is at the first location. For ease of description, the mannerism is described as the pupil movement of the user. However, in other implementations, the mannerism may include an eye gaze of the user or lip movement of the user.

The virtual object 320 may move from the first location of the user interface in the first configuration 302 to a second location (e.g., a lower-right corner) of the user interface in the second configuration 304. As the virtual object 320 moves from the first location in the first configuration 302 to the second location in the second configuration 304, the sensor at the mobile device may monitor (e.g., detect and/or track) the mannerism of the user. For example, the sensor may track whether the user's pupils move from the upper-left, at 312, to the lower-right, at 314. Thus, in tracking the user's pupil movement, a processor may determine a correlation between the pupil movement and the change in location of the virtual object 320. As described below, the processor may power down a light emitting display (LED) screen of the mobile device (e.g., enter a low-power state) if the correlation fails to satisfy a threshold. If the correlation satisfies the threshold, the processor may power up the LED screen (e.g., continue to operate the mobile device in a high-power state).

The virtual object 320 may move from the second location of the user interface in the second configuration 304 to a third location (e.g., a lower-left corner) of the user interface in the third configuration 306. As the virtual object 320 moves from the second location in the second configuration 304 to the third location in the third configuration 306, the sensor at the mobile device may monitor (e.g., detect and/or track) the mannerism of the user. For example, the sensor may track whether the user's pupils move from the lower-right, at 314, to the lower-left, at 316. Thus, in tracking the user's pupil movement, the processor may determine a correlation between the pupil movement and the change in location of the virtual object 320. The processor may power down the LED screen of the mobile device (e.g., enter a low-power state) if the correlation fails to satisfy a threshold. If the correlation satisfies the threshold, the processor may power up the LED screen (e.g., continue to operate the mobile device in a high-power state).

The virtual object 320 may move from the third location of the user interface in the third configuration 306 to a fourth location (e.g., an upper-right corner) of the user interface in the fourth configuration 308. As the virtual object 320 moves from the third location in the third configuration 306 to the fourth location in the fourth configuration 308, the sensor at the mobile device may monitor (e.g., detect and/or track) the mannerism of the user. For example, the sensor may track whether the user's pupils move from the lower-left, at 316, to the upper-right, at 318. Thus, in tracking the user's pupil movement, the processor may determine a correlation between the pupil movement and the change in location of the virtual object 320. The processor may power down the LED screen of the mobile device (e.g., enter a low-power state) if the correlation fails to satisfy a threshold. If the correlation satisfies the threshold, the processor may power up the LED screen (e.g., continue to operate the mobile device in a high-power state).

The techniques described with respect to FIG. 3 may conserve battery power at the mobile device. For example, because the virtual object 320 becomes visible after a prolonged period of user inactivity, monitoring the mannerism of the user based on changing configurations 302-308 of the user interface may enable the processor to determine whether the user is looking at the user interface. To illustrate, if correlation between pupil movement and the change in location of the virtual object 320 satisfies the threshold, the processor may determine that the user is looking at the user interface and may continue to operate the mobile device in a high-power state. However, if the correlation fails to satisfy the threshold, the processor may determine that there is a relatively high likelihood the user is not looking at the user interface and may power-down the LED screen to conserve battery power.

Figure 4:
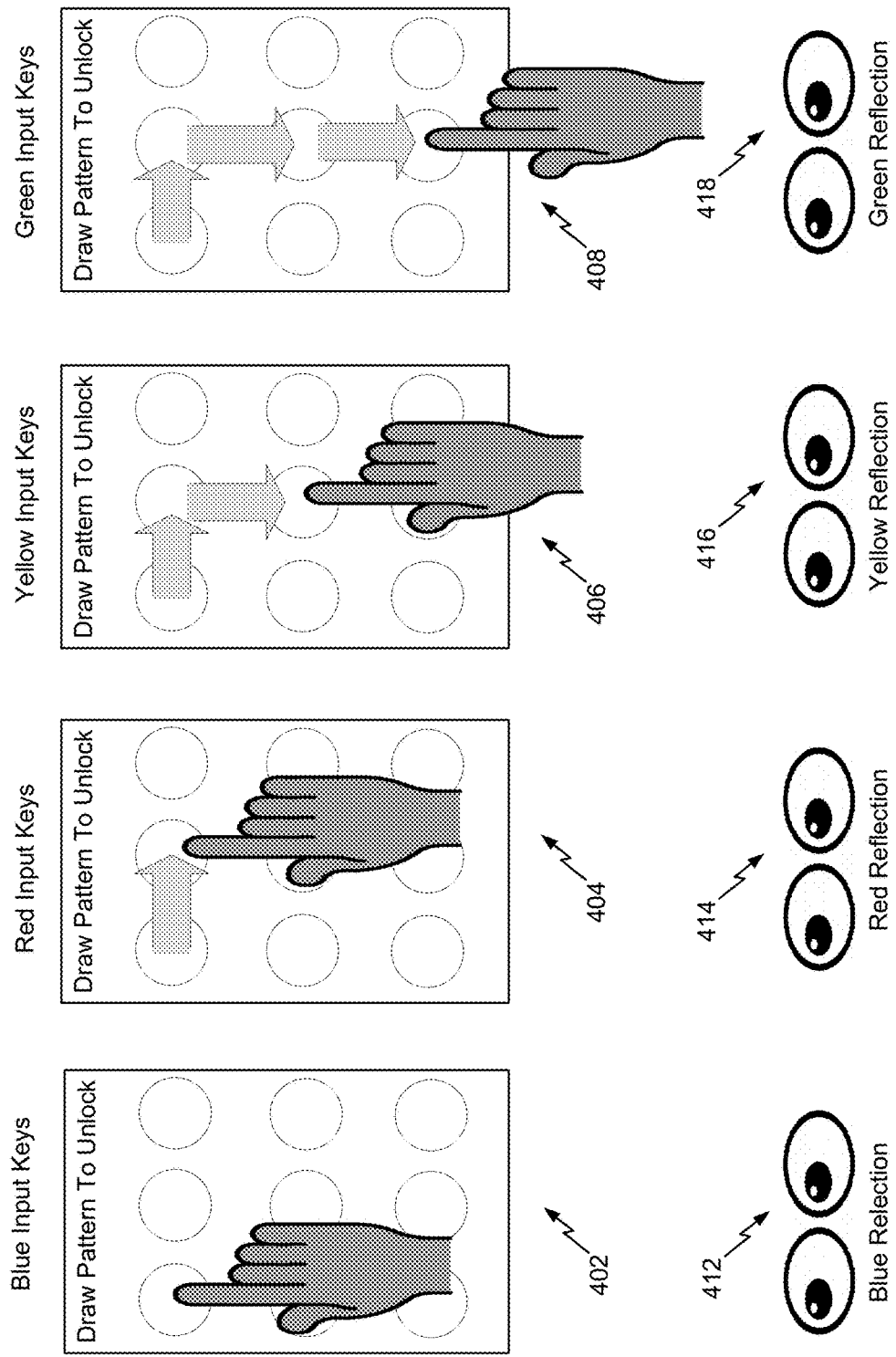
FIG. 4 illustrates another technique for authenticating a user identity at a mobile device using a mannerism of a user.

Referring to FIG. 4, another technique for authenticating a user identity at a mobile device using a mannerism of the user is shown. A processor may generate a user interface that is operable to receive an input from a user of the mobile device. According to FIG. 4, the user interface may have a first configuration 402, a second configuration 404, a third configuration 406, and a fourth configuration 408. It should be understood that the configurations 402-408 illustrated in FIG. 4 are merely non-limiting examples and other configurations may be used in conjunction with the techniques described herein.

According to FIG. 4, the user may draw a pattern using the user interface to access data stored at the mobile device (e.g., to "unlock" the mobile device). Although a pattern is illustrated as an authentication input in FIG. 4, in other implementations, a password, a PIN, or a secure token may also be entered as an authentication input.

The user may touch a first input key (e.g., a virtual object) of the pattern when the user interface has the first configuration 402. According to the first configuration 402, one or more of the input keys may be a first color. For example, one or more of the input keys in the user interface may be blue. A sensor may monitor a mannerism (e.g., the pupil color) of the user when the user interface has the first configuration 402 (e.g., when the input keys are blue). For example, the sensor may detect that the user's pupils have a blue reflection, at 412. Because the reflected color of the user's pupils match the color of the input keys, a processor may determine that a "real-life" user is drawing the pattern. For ease of description, each change in configuration is described as a different input key color. However, in other implementations, each change in configuration may include a different background color.

After touching the first input key, the configuration of the user interface may change to the second configuration 404. For example, the color of the input keys in the user interface may turn red. The sensor may monitor the pupil color of the user when the user interface has the second configuration 404 (e.g., when the input keys are red). For example, the sensor may detect that the user's pupils have a red reflection, at 414. Because the reflected color of the user's pupils match the color of the input keys, the processor may determine that a real-life user is drawing the pattern. The user may slide his or her finger to the second input key of the pattern after touching the first input key. According to FIG. 4, the second input key is located to the right of the first input key.

After touching the second input key, the configuration of the user interface may change to the third configuration 406. For example, the color of the input keys in the user interface may turn yellow. The sensor may monitor the pupil color of the user when the user interface has the third configuration 406 (e.g., when the input keys are yellow). For example, the sensor may detect that the user's pupils have a yellow reflection, at 416. Because the reflected color of the user's pupils match the color of the input keys, the processor may determine that a real-life user is drawing the pattern. The user may slide his or her finger to the third input key of the pattern after touching the second input key. According to FIG. 4, the third input key is located beneath the second input key.

After touching the third input key, the configuration of the user interface may change to the fourth configuration 408. For example, the color of the input keys in the user interface may turn green. The sensor may monitor the pupil color of the user when the user interface has the fourth configuration 408 (e.g., when the input keys are green). For example, the sensor may detect that the user's pupils have a green reflection, at 418. Because the reflected color of the user's pupils match the color of the input keys, the processor may determine that a real-life user is drawing the pattern. The user may slide his or her finger to the fourth input key of the pattern after touching the second input key to unlock the mobile device (e.g., to access data stored at the mobile device). According to FIG. 4, the fourth input key is located beneath the third input key.

The techniques described with respect to FIG. 4 may reduce security breaches at the mobile device. For example, if the user interface requires the user to draw a pattern to unlock the mobile device, the techniques of FIG. 4 may prevent an unauthorized third party from using security breaching techniques to automatically detect and override the pattern. For example, monitoring the mannerism (e.g., the pupil color) may be used as a security mechanism to verify that a real-life person is drawing the pattern to unlock the mobile device.

Figure 5:
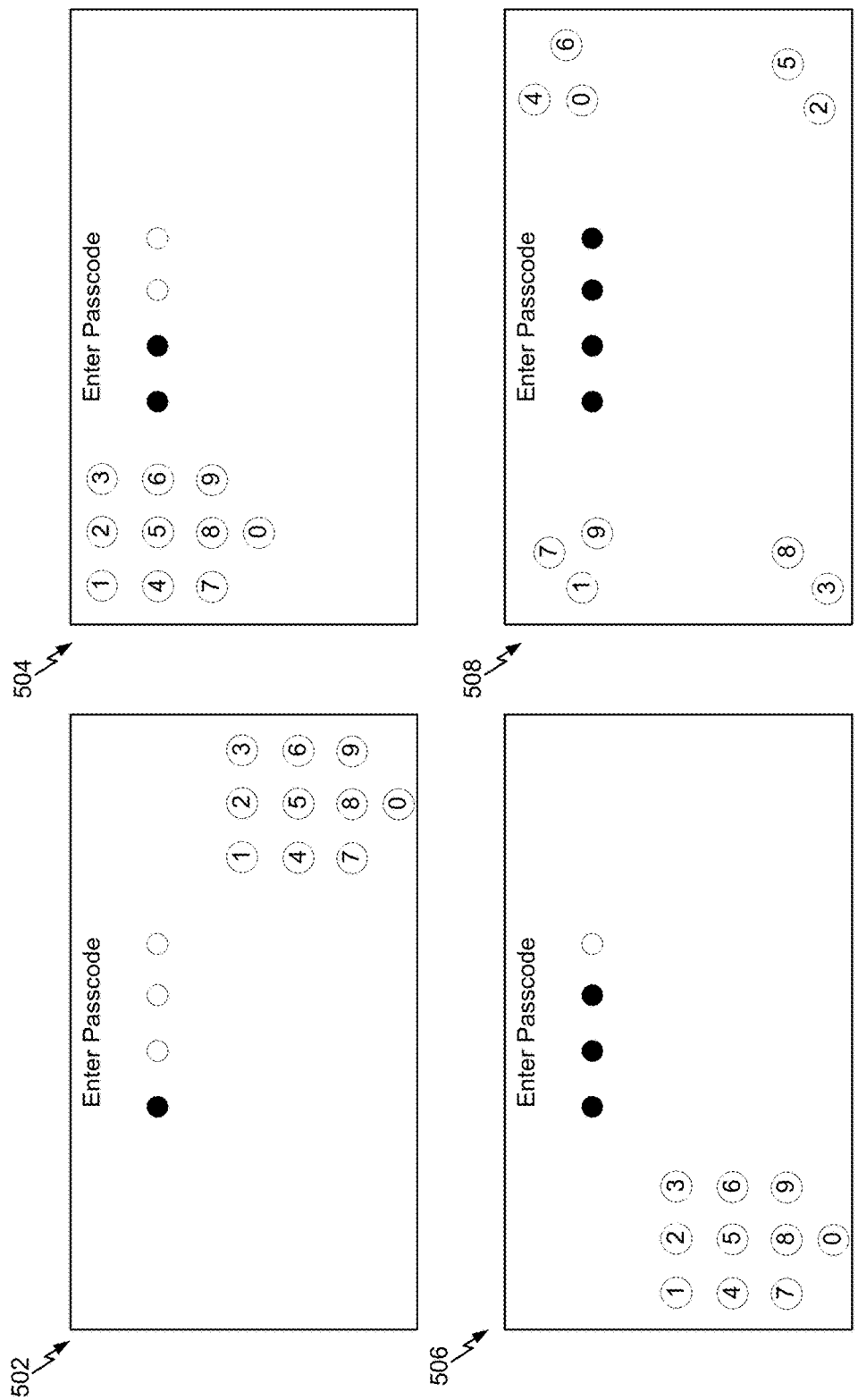
FIG. 5 illustrates another technique for authenticating a user identity at a mobile device using a mannerism of a user.

Referring to FIG. 5, another technique for authenticating a user identity at a mobile device using a mannerism of the user is shown. A processor may generate a user interface that is operable to receive an input from a user of the mobile device. According to FIG. 5, the user interface may have a first configuration 502, a second configuration 504, a third configuration 506, and a fourth configuration 508. It should be understood that the configurations 502-508 illustrated in FIG. 5 are merely non-limiting examples and other configurations may be used in conjunction with the techniques described herein.

For ease of description and illustration, the user may enter the same personal identification number (PIN) (e.g., "8614") in FIG. 2 using the user interface of FIG. 5 to access data stored at the mobile device. Although a PIN is illustrated as the authentication input in FIG. 2, in other implementations, a password or a secure token may also be entered as an authentication input.

The user may enter the first digit (e.g., "8") of the PIN when the user interface has the first configuration 502. According to the first configuration 502, the input keys "0-9" may be at a first location (e.g., the bottom-right location). When the user enters the first digit of the PIN, a sensor at the mobile device may detect a mannerism of the user. For ease of description, the mannerism described with respect to FIG. 2 may be used in conjunction with the techniques of FIG. 5. To illustrate, the sensor may monitor the pupil movement of the user when the user enters the first digit of the PIN. For example, the sensor may detect the user's pupils move to the lower right, at 212, when the user enters the first digit of the PIN. Because the input keys are located at the first location, the processor may determine that the orientation of the user's pupils correlate to the location of the input keys. Each input key may be a virtual object included in the user interface. For ease of description, the mannerism is described as the pupil movement of the user. However, in other implementations, the mannerism may include an eye gaze of the user or lip movement of the user.

After entering the first digit of the PIN, the configuration of the user interface may change to the second configuration 504. According to the second configuration 504, the input keys "0-9" may be at a second location (e.g., the top-left location). When the user enters the second digit (e.g., "6") of the PIN, the sensor at the mobile device may monitor (e.g., detect and/or track) the mannerism of the user. For example, the sensor may detect the user's pupils move to the upper left, at 214, when the user enters the second digit of the PIN. Because the input keys are located at the second location, the processor may determine that the orientation of the user's pupils correlate to the location of the input keys.

After entering the second digit of the PIN, the configuration of the user interface may change to the third configuration 506. According to the third configuration 506, the input keys "0-9" may be at a third location (e.g., the bottom-left location). When the user enters the third digit (e.g., "1") of the PIN, the sensor at the mobile device may monitor (e.g., detect and/or track) the mannerism of the user. For example, the sensor may detect the user's pupils move to the lower left, at 216, when the user enters the third digit of the PIN. Because the input keys are located at the third location, the processor may determine that the orientation of the user's pupils correlate to the location of the input keys.

After entering the third digit of the PIN, the configuration of the user interface may change to the fourth configuration

508. According to the fourth configuration 508, the input keys "1, 7, and 9" may be at the second location, input keys "2 and 5" may be at the first location, input keys "3 and 8" may be at the third location, and input keys "0, 4, and 6" may be at a fourth location (e.g., the top-right location). When the user enters the fourth digit (e.g., "4") of the PIN, the sensor at the mobile device may monitor (e.g., detect and/or track) the mannerism of the user. For example, the sensor may detect the user's pupils move to the upper right, at 218, when the user enters the fourth digit of the PIN. Because the input key "4" is located at the fourth location, the processor may determine that the orientation of the user's pupils correlate to the location of the input keys.

The techniques described with respect to FIG. 5 may reduce security breaches at the mobile device. For example, if the user interface requires the user to provide a biometric feature, such as a depiction of the user's face, the techniques of FIG. 5 may prevent an unauthorized third party that knows the PIN to use a "spoof" (e.g., a picture or video of an authorized user) to gain access to data stored at the mobile device. For example, mannerism (e.g., pupil movement) monitoring may prevent an unauthorized third party from placing video (or a picture) of an authorized user to the user interface while entering the PIN because the user's pupils in the video may not correlate to the location of the digits as the digits are being entered.

Figure 6:
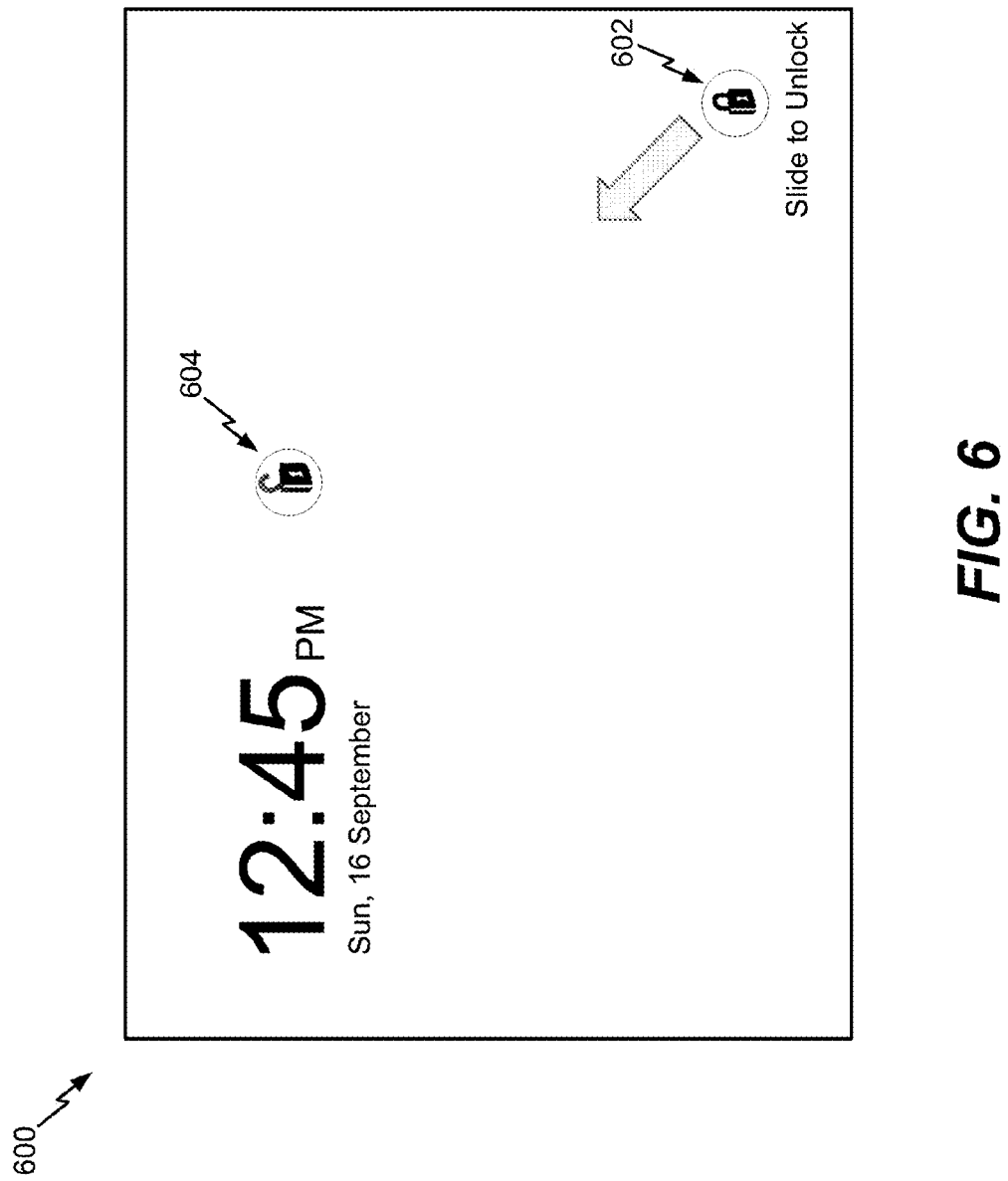
FIG. 6 illustrates a user interface that is operable to receive a swipe input based on a user configurable pattern.

Referring to FIG. 6, a user interface 600 that receives a "swipe" input based on a user configurable pattern is shown. For example, a processor may receive an indication of a user configurable pattern. The user configurable pattern may indicate locations on the user interface that are spatially separated, and the locations may be usable to access data at a mobile device. Upon receiving the indication, the processor may generate the user interface 600 based on the user configurable pattern.

According to the user interface 600, a first location 602 and a second location 604 may be selected by a user. For example, the user may select the first location 602 and the second location 604 during a configuration process. Thus, the first location 602 and the second location 604 may be user configurable. According to the implementation of FIG. 6, the first location 602 may be located at a diagonal from the second location 604. The user may place their finger at the first location 602 and slide their finger to the second location 604 to access data stored at the mobile device.

Figure 7:
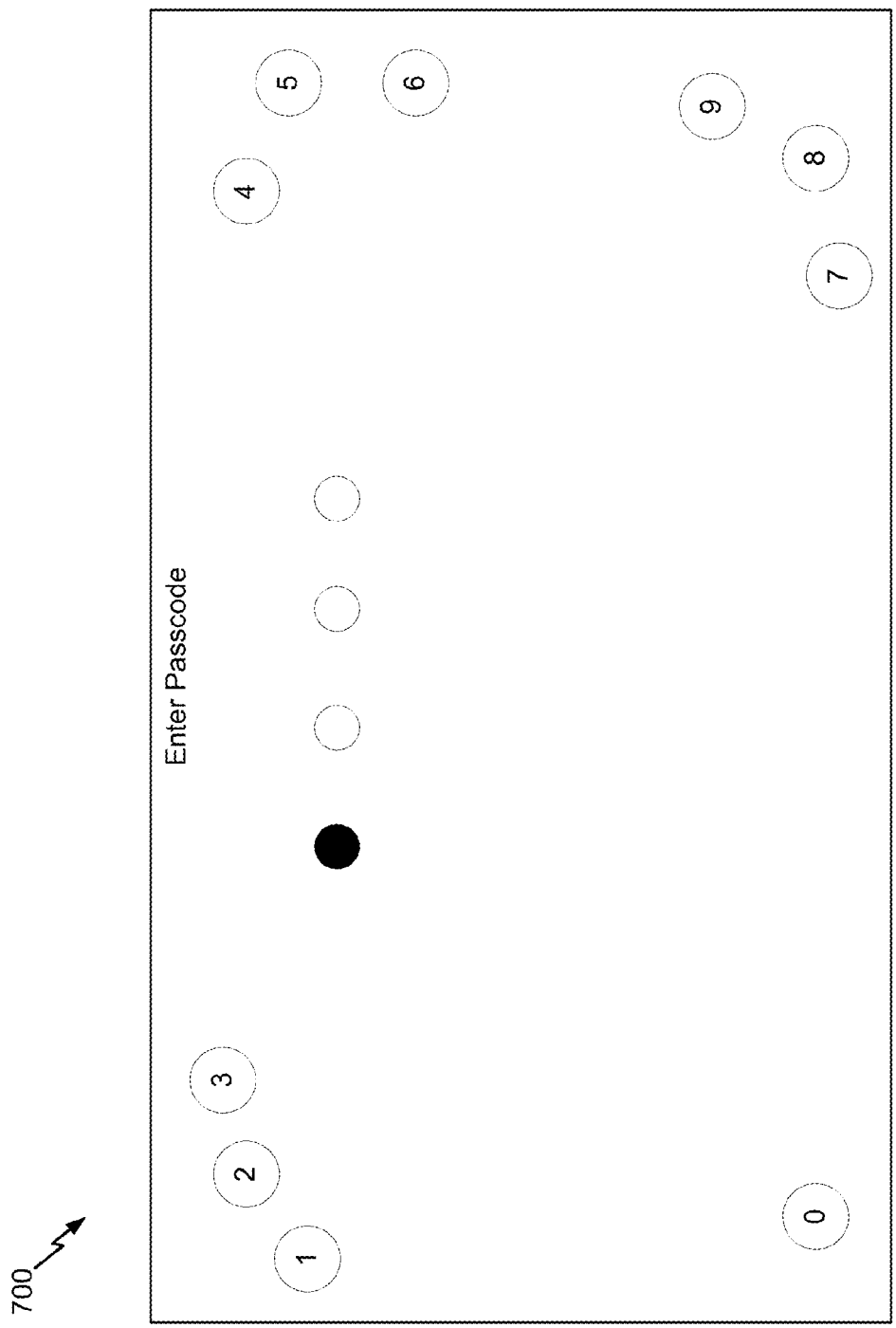
FIG. 7 illustrates a custom authentication user interface that is operable to receive a personal identification number from a user to access data stored at a mobile device.

Referring to FIG. 7, a custom authentication user interface 700 that is operable to receive a PIN from a user to access data stored at a mobile device is shown. Numerical input keys of the user interface 700 may be spatially separated. In the illustrated example, numerical input keys "1-3" are located at a top-left corner of the user interface 700, numerical input keys "4-6" are located at a bottom-right corner of the user interface 700, numerical input keys "7-9" are located at a bottom-right corner of the user interface 700, and numerical input key "0" is located at a bottom-left corner of the user interface 700.

A user may enter the PIN using the numerical input keys to access data stored at the mobile device. The location of each numerical input key may be user configurable. For example, a user of the mobile device may select the location of each numerical input key during a configuration process. According to a particular implementation, the configuration of one or more numerical input keys may change upon entering a digit of the PIN (in a substantially similar way to the techniques of FIG. 2). Additionally, a mannerism may be monitored based on the techniques of FIG. 2 to grant access to data stored at the mobile device.

It should be appreciated that the location of each numerical input key in the user interface 700 is for illustrative purposes only and should not be construed as limiting. For example, in other implementations, numerical input keys "1, 3, and 5" may be located in the bottom-right corner of the user interface 700, numerical input key "6" may be located in the center of the user interface 700, etc.

Figure 8:
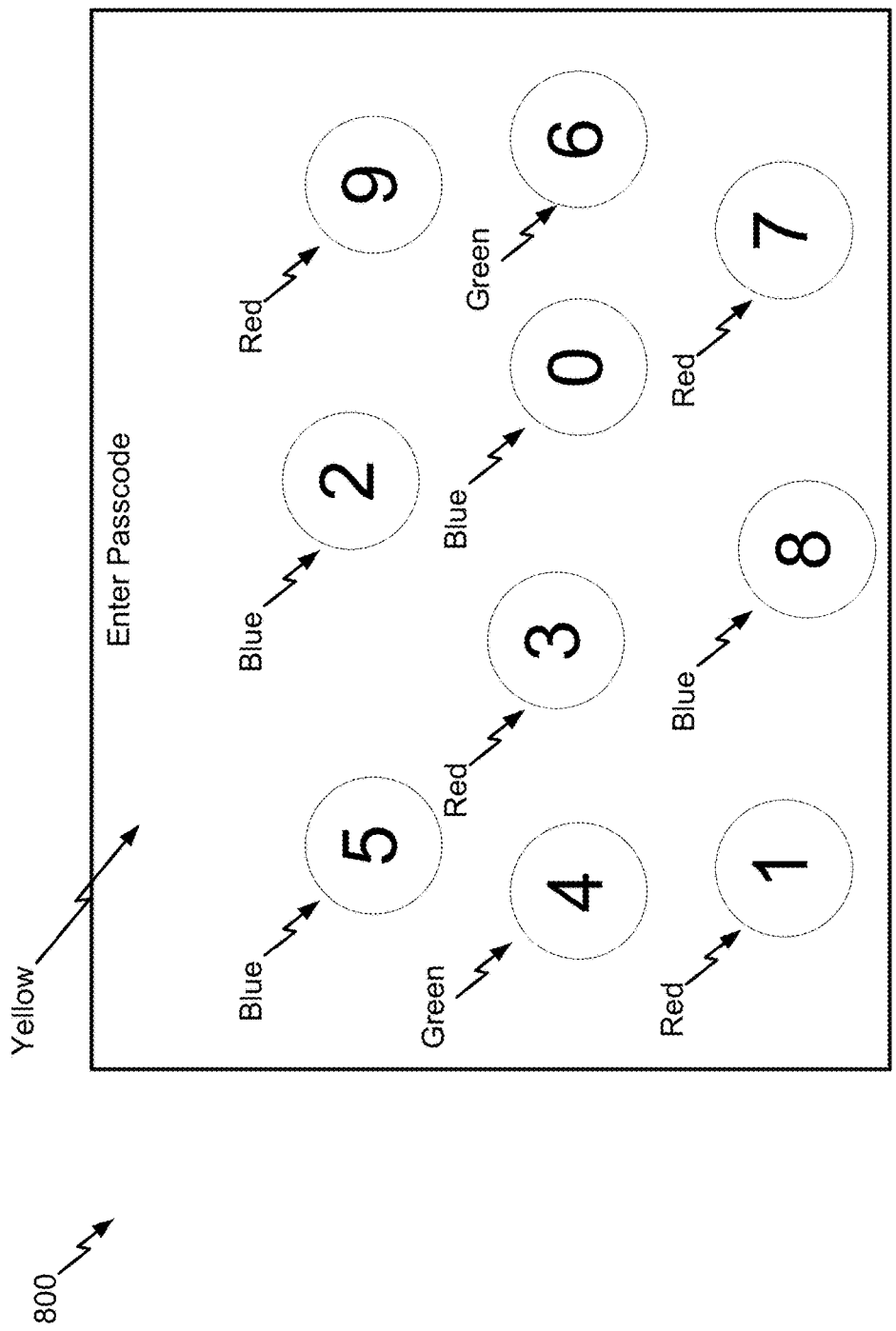
FIG. 8 illustrates another custom authentication user interface that is operable to receive a personal identification number from a user to access data stored at a mobile device.

Referring to FIG. 8, another custom authentication user interface 800 that is operable to receive a PIN from a user to access data stored at a mobile device. Numerical input keys of the user interface 800 may be spatially separated and may have different colors. In the illustrated example, numerical input keys "1, 3, 7, and 9" are red, numerical input keys "0, 2, 5, and 8" are blue, and numerical input keys "4 and 6" are green. The background of the user interface 800 is yellow. A user may enter the PIN using the numerical input keys to access data stored at the mobile device.

It should be appreciated that the colors and locations of the numerical input keys and the color of the background are merely illustrative and should not be construed as limiting. In other implementations, the background may be a different color (e.g., red, blue, orange, etc.) and the colors/location of the numerical input keys may also be different. According to a particular implementation, the location of each numerical input key, the color of each numerical input key, and the color of the background may be user configurable. For example, a user of the mobile device may select the location/color of each numerical input key and may select the color of the background during a configuration process.

According to another implementation, the color used for the numerical input keys or the color of the background may be based on a color of user's pupils or clothes. For example, a sensor may detect the color of the user's pupils or clothes, and a processor may generate the numerical keys in user interface based on the detected colors. Whether the color is based on the user's pupils or clothes may depend on a user configurable setting. As a non-limiting example, the user may indicate for the color of the numerical input keys to be based on the color of the user's pupils and may indicate for the color of the background to be based on the color the user's clothes. To illustrate, when the user looks at the user interface 800 to enter the PIN, the sensor may detect a color of the user's pupils and clothes. If the user has brown pupils and is wearing a red shirt, the color of the input keys in the user interface 800 may be brown and the color of the background may be red, based on the user configurable settings.

According to a particular implementation, the configuration of one or more numerical input keys may change upon entering a digit of the PIN (in a substantially similar way to the techniques of FIG. 2). Additionally, a mannerism may be monitored based on the techniques of FIG. 2 to grant access to data stored at the mobile device.

Figure 9:
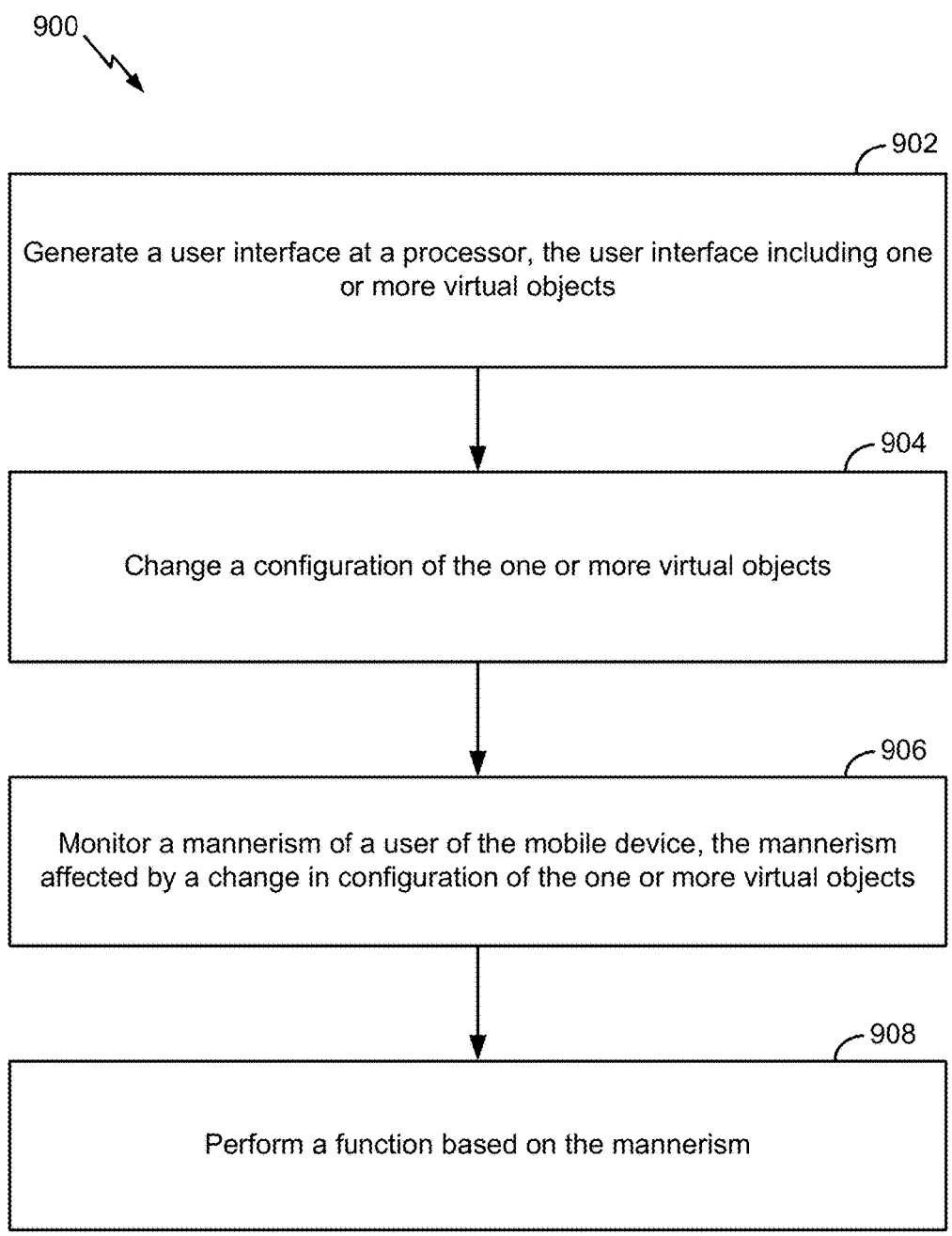
FIG. 9 is a flowchart of a method for using a mannerism to interact with a user interface.

Referring to FIG. 9, a flowchart of a method 900 for using a mannerism to interact with a user interface is shown. The method 900 may be performed using one or more of the techniques described with respect to FIGS. 2-8.

The method 900 includes generating a user interface at a processor, at 902. The user interface includes one or more virtual object. For example, referring to FIG. 2, a processor may generate the user interface that is operable to receive an input from a user of the mobile device. The user interface in FIG. 2 may have ten virtual objects (e.g., ten input keys. As another example, referring to FIG. 3, a processor may generate the user interface that includes the virtual object 320.

A configuration of the one or more virtual objects may change, at 904. For example, referring to FIG. 2, each time the user enters a different digit of the PIN, the configuration of the user interface may change. As another example, referring to FIG. 3, the virtual object 320 may become visible on the user interface after a prolonged period of user inaction. For example, if the user has failed to touch the user interface for a particular period of time, the virtual object 320 may become visible on the user interface.

A mannerism of a user may be monitored at the mobile device, at 906. The mannerism may be affected by a change in configuration of the one or more virtual objects. For example, referring to FIG. 2, the mannerism (e.g., the user's pupil movement) may be affected by a change in configuration of the interface and the input (e.g., the PIN) provided to the user interface. As another example, referring to FIG. 3, the user's pupils may move in a direction of the virtual object 320.

A function may be performed based on the mannerism, at 908. For example, referring to FIG. 2, the processor may authenticate the user identity based on the input and the mannerism. To illustrate, if the PIN is correctly entered and the orientation of the user's pupils changes accordingly after each digit of the PIN is entered, the processor may allow the user to access data stored at the mobile device. As another example, referring to FIG. 3, monitoring the mannerism of the user based on changing configurations 302-308 of the user interface may enable the processor to determine whether the user is looking at the user interface. To illustrate, if correlation between pupil movement and the change in location of the virtual object 320 satisfies the threshold, the processor may determine that the user is looking at the user interface and may continue to operate the mobile device in a high-power state. However, if the correlation fails to satisfy the threshold, the processor may determine that there is a relatively high likelihood the user is not looking at the user interface and may power-down the LED screen to conserve battery power.

According to one implementation of the method 900, monitoring the mannerism may include monitoring pupil movement of the user, monitoring an eye gaze of the user, monitoring lip movement of the user, or a combination thereof. The one or more virtual objects may include input keys that are operable to receive an authentication input from the user. Changing the configuration of the one or more virtual objects may include changing a color of one or more of the input keys in response to receiving each entry of the authentication input, changing a location of one or more of the input keys on the user interface in response to receiving each entry of the authentication input, or a combination thereof. The authentication input may include at least one of a PIN, a password, or a secure token.

According to one implementation, the method 900 may also include receiving data indicating a biometric feature of the user. The mannerism may be associated with the biometric feature. As a non-limiting example, the biometric feature may correspond to a facial feature of the user and the mannerism may correspond to pupil movement. The method 900 may also include authenticating a user identity based on the authentication input, the biometric feature, and the mannerism.

According to one implementation of the method 900, changing the configuration of the one or more virtual objects include changing a location of the one or more virtual objects. Monitoring the mannerism may include monitoring pupil movement of the user when the configuration of the one or more virtual objects changes. The method 900 may also include determining a correlation between the pupil movement and a change in location of the one or more virtual objects. The method 900 may include powering down a LED display screen of the mobile device if the correlation fails to satisfy a threshold and powering up the LED display screen if the correlation satisfies the threshold.

The method 900 of FIG. 9 may reduce security breaches at the mobile device. For example, if the user interface requires the user to provide a biometric feature, such as a depiction of the user's face, the method 900 may prevent an unauthorized third party that knows the PIN to use a "spoof" (e.g., a picture or video of an authorized user) to gain access to data stored at the mobile device. For example, mannerism (e.g., pupil movement) monitoring may prevent an unauthorized third party from placing video (or a picture) of an authorized user to the user interface while entering the PIN because the user's pupils in the video may not correlate to the location of the digits as the digits are being entered. The method 900 may also conserve battery power at the mobile device.

Figure 10:
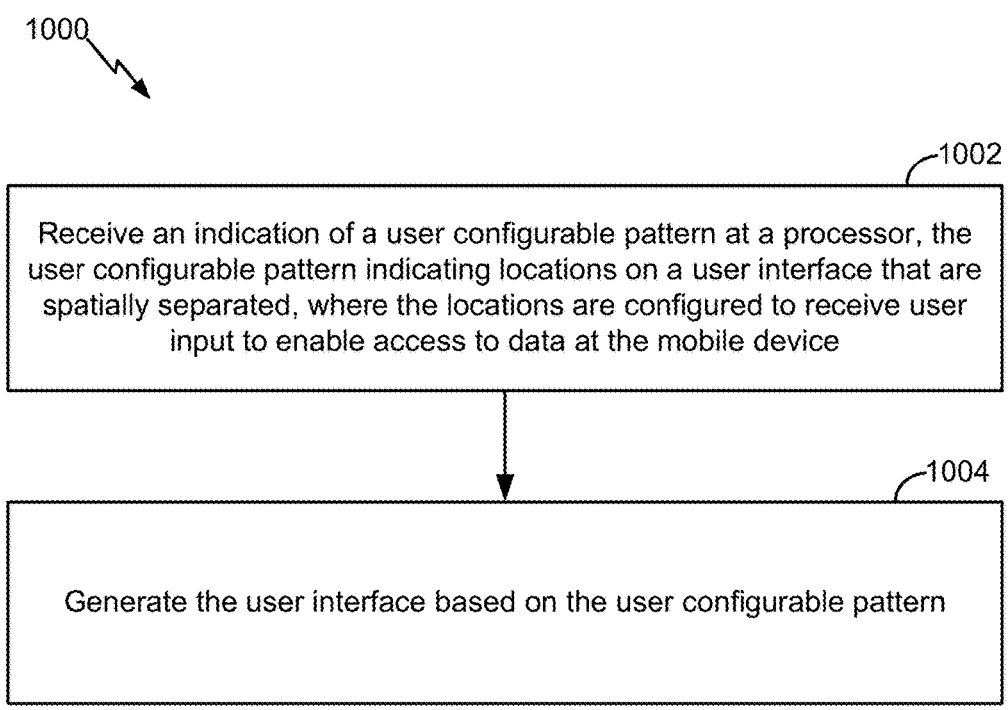
FIG. 10 is a flowchart of a method for conserving power at a mobile device using a mannerism of a user.

Referring to FIG. 10, a method 1000 for conserving power at a mobile device using a mannerism of the user is shown. The method 1000 may be performed using one or more of the techniques described with respect to FIGS. 2-8.

The method 1000 includes receiving an indication of a user configurable pattern at a processor, at 1002. The user configurable pattern may indicate locations on a user interface that are spatially separated. The locations may be configured to receive user input to enable access to data at the mobile device. For example, referring to FIG. 7, the location of each numerical input key may be user configurable. To illustrate, a user of the mobile device may select the location of each numerical input key during a configuration process.

The user interface may be generated based on the user configurable pattern, at 1004.

For example, referring to FIG. 7, the processor may generate the user interface 700 based on the user configurable pattern.

According to one implementation of the method 1000, each location may display an input key that enables entry of an authentication code. A color of at least one input key may be based on a pupil color of a user of the mobile device. Alternatively, or in addition, a color of at least one input key may be based on a color of an article of clothing of a user of the mobile device. One or more input keys may be different colors. For example, a first input key may have a different color than a second input key. The authentication input may include a PIN, a password, or a secure token. A background color of the user interface may be based on a pupil color of the user or based on a color of an article of clothing of the user.

According to one implementation of the method 1000, the locations may include a first location and a second location. A swipe input between the first location and the second location may enable access to the data.

Figure 11:
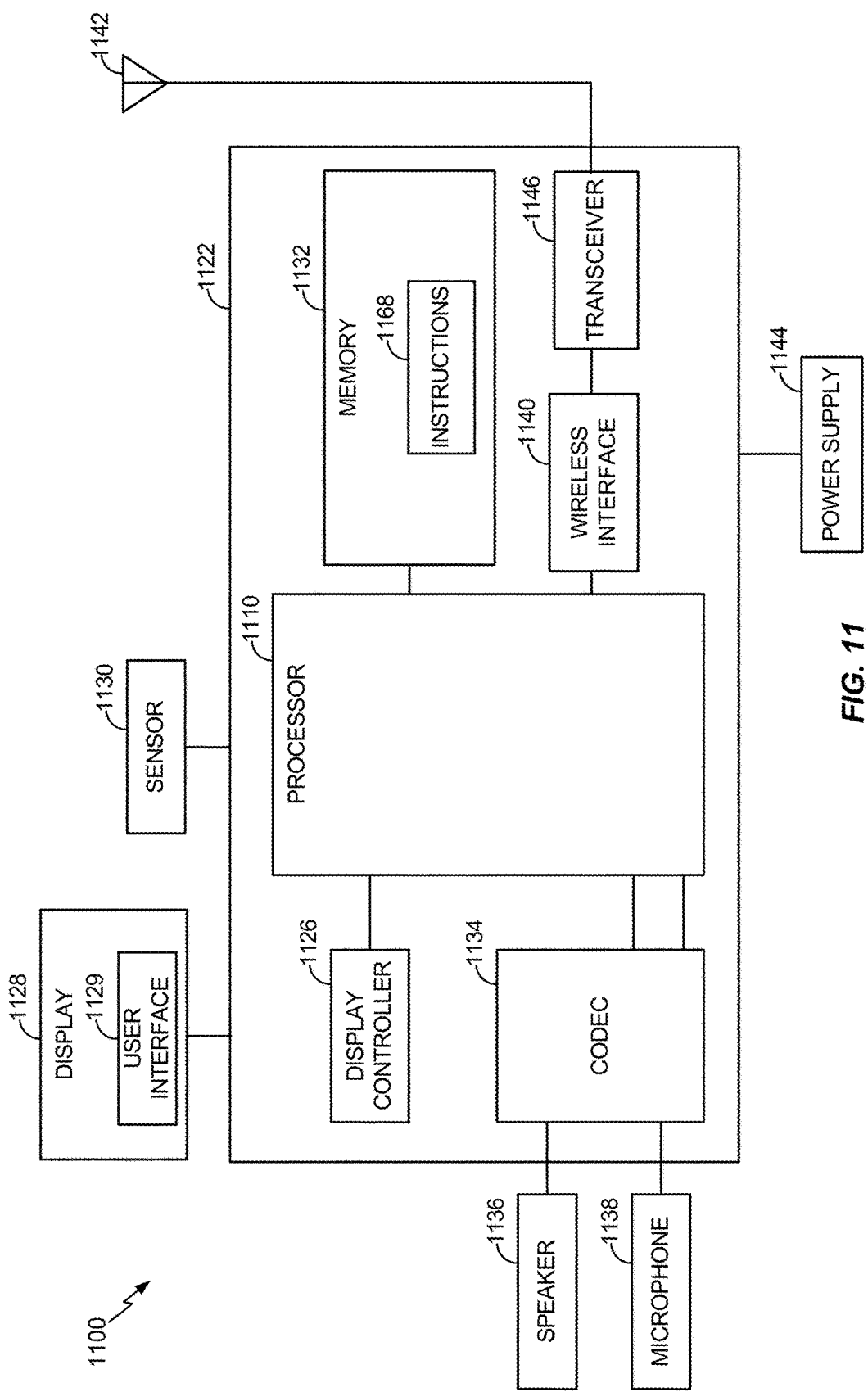
FIG. 11 is a block diagram of a device operable to perform one or more techniques described with respect to FIGS. 1-10.

Referring to FIG. 11, a wireless communication device is depicted and generally designated 1100. The device 1100 includes a processor 1110, such as a digital signal processor, coupled to a memory 1132.

The processor 1110 may be configured to execute software (e.g., a program of one or more instructions 1168) stored in the memory 1132. In a particular implementation, the processor 1110 may be operable to perform the method 900 of FIG. 9 and/or the method 1000 of FIG. 10. For example, the processor 1110 may be configured to execute one or more instructions 1168 stored in the memory 1132 to perform the method 900 of FIG. 9 and/or the method 1000 of FIG. 10. For example, the memory 1132 may be a non-transitory computer-readable medium that includes instructions 1168 that, when executed by the processor 1110, cause the processor 1110 to perform the method 900 of FIG. 9 and/or the method 1000 of FIG. 10.

A wireless interface 1140 may be coupled to the processor 1110 and to an antenna 1142.

A coder/decoder (CODEC) 1134 can also be coupled to the processor 1110. A speaker 1136 and a microphone 1138 can be coupled to the CODEC 1134. A display controller 1126 can be coupled to the processor 1110 and to a display device 1128. The display device 1128 may display a user interface 1129 that operates in conjunction with the techniques described with respect to FIGS. 1-9. In a particular implementation, the processor 1110, the display controller 1126, the memory 1132, the CODEC 1134, and the wireless interface 1140 are included in a system-in-package or system-on-chip device 1122. In a particular implementation, a sensor 1130 and a power supply 1144 are coupled to the system-on-chip device 1122. In a particular implementation, the sensor 1130 may monitor mannerisms according to the techniques with respect to FIGS. 1-9. Moreover, in a particular implementation, as illustrated in FIG. 11, the display device 1128, the sensor 1130, the speaker 1136, the microphone 1138, the antenna 1142, and the power supply 1144 are external to the system-on-chip device 1122. However, each of the display device 1128, the sensor 1130, the speaker 1136, the microphone 1138, the antenna 1142, and the power supply 1144 can be coupled to one or more components of the system-on-chip device 1122, such as one or more interfaces or controllers.

The device 1100 corresponds to a mobile communication device, a smartphone, a cellular phone, a laptop computer, a computer, a tablet computer, a personal digital assistant, a display device, a television, a gaming console, a music player, a radio, a digital video player, an optical disc player, a tuner, a camera, a navigation device, or any combination thereof.

In conjunction with the described implementations, a first apparatus includes means for generating a user interface. The user interface may include one or more virtual objects. For example, the means for generating the user interface may include the processor 1110 of FIG. 11, the display controller 1126 of FIG. 11, the display device 1128 of FIG. 11, one or more other devices, circuits, modules, or any combination thereof.

The first apparatus may also include means for changing a configuration of the one or more virtual objects. For example, the means for changing the configuration may include the processor 1110 of FIG. 11, the display controller 1126 of FIG. 11, the display device 1128 of FIG. 11, one or more other devices, circuits, modules, or any combination thereof.

The first apparatus may also include means for monitoring a mannerism of a user of a mobile device. The mannerism may be affected by a change in configuration of the one or more virtual objects. For example, the means for monitoring the mannerism may include the sensor 1130 of FIG. 11, the processor 1110 of FIG. 11, one or more other devices, circuits, modules, or any combination thereof.

The first apparatus may also include means for performing a function based on the mannerism. For example, the means for performing the function may include the processor 1110 of FIG. 11, the display controller 1126 of FIG. 11, the display device 1128 of FIG. 11, one or more other devices, circuits, modules, or any combination thereof.

In conjunction with the described implementations, a second apparatus includes means for receiving an indication of a user configurable pattern. The user configurable pattern may indicate locations on a user interface that are spatially separated. The locations may be configured to receive user input to enable access to data at the mobile device. For example, the means for receiving the indication may include the processor 1110 of FIG. 11, the display controller 1126 of FIG. 11, one or more other devices, circuits, modules, or any combination thereof.

The second apparatus may include means for generating the user interface based on the user configurable pattern. For example, the means for generating the user interface may include the processor 1110 of FIG. 11, the display controller 1126 of FIG. 11, the display device 1128 of FIG. 11, one or more other devices, circuits, modules, or any combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An apparatus comprising:
a touch screen of a computing device configured to display a plurality of input keys, wherein the plurality of input keys are displayed in a first arrangement of an input key pattern on the touch screen having a first color; and
a processor coupled to the touch screen, the processor configured to:
compare a first color of light reflected from an eye of a user to the first color displayed by the touch screen;
in response to receiving an indication of contact with a first input key, change a position of one or more of the plurality of input keys to generate a second arrangement of the input key pattern of the plurality of input keys and change the color displayed by the touch screen to a second color;
compare a second color of light reflected from the eye of the user to the second color displayed by the touch screen after receiving an indication of contact with a second input key; and
determine whether to enable access to the computing device based, at least in part, on the comparison of colors reflected from the eye of the user matching the colors displayed by the touch screen and the received indication of the contact with the input keys.

2. The apparatus of claim 1, wherein the position of the one or more of the plurality of input keys is randomly changed to generate the second arrangement of the input key pattern of the plurality of input keys.

3. The apparatus of claim 1, wherein the processor is further configured to the determine a characteristic associated with the user in response to receiving the indication of the contact with the first input key, wherein the characteristic associated with the user corresponds to an eye movement of the user, an orientation of an eye of the user, light reflected from a face or an eye of the user, a pupil size of the user, lip movement of the user, or a combination thereof, and wherein determining whether to enable access to the computing device is further based on the characteristic associated with the user and the indication of the contact with the first input key.

4. The apparatus of claim 3, wherein the processor is further configured to determine a second characteristic associated with the user in response to receiving the indication of the contact with the second input key of the plurality of input keys displayed in the second arrangement of the input key pattern, wherein determining whether to enable access to the computing device is further based on the second characteristic associated with the user and the indication of the contact with the second input key.

5. The apparatus of claim 1, wherein the processor is further configured to:
determine a first position on the touch screen that corresponds to a first gaze direction of the user in response to receiving the indication of the contact with the first input key of the plurality of input keys displayed on the touch screen;
determine whether the first position corresponds to a location of the first input key displayed on the touch screen;
determine a second position on the touch screen that corresponds to a second gaze direction of a user in response to receiving the indication of the contact with the second input key of the plurality of input keys displayed on the touch screen; and
determine whether the second position corresponds to a location of the second input key displayed on the touch screen.

6. The apparatus of claim 1, wherein the processor is further configured to determine whether the second reflected color from the eye of the user matches the second color displayed by the touch screen.

7. The apparatus of claim 1, wherein the input keys of the plurality of input keys are displayed in the input key pattern at a first location on the touch screen, and wherein the processor is further configured to change the first location of the input key pattern of the plurality of input keys to a second location on the touch screen after receiving the indication of the contact with the first input key.

8. The apparatus of claim 1, wherein a first set of one or more of the plurality of input keys is displayed at a first location on the touch screen, wherein a second set of one or more of the plurality of input keys is displayed at a second location on the touch screen, and wherein the processor is further configured to change the locations of the first set and the second set to different locations on the touch screen after receiving the indication of the contact with the first input key.

9. The apparatus of claim 1, wherein the plurality of input keys comprises the first input key and an ending input key, wherein the first input key is displayed at a first position and the ending input key is displayed at a second position on the touch screen, wherein a first swipe path is defined between the first input key and the ending input key, and wherein the processor is further configured to determine a characteristic associated with the user in response to receiving an indication of contact with the ending input key.

10. A method comprising:
displaying a plurality of input keys in a first arrangement of an input key pattern on a touch screen of a computing device, the touch screen displaying a first color;
comparing a first color of light reflected from an eye of a user to the first color displayed by the touch screen;
in response to receiving an indication of contact with a first input key, changing a position of one or more of the plurality of input keys to generate a second arrangement of the input key pattern of the plurality of input keys and changing the color displayed by the touch screen to a second color;
comparing a second color of light reflected from the eye of the user to the second color displayed by the touch screen after receiving an indication of contact with a second input key; and
determining whether to enable access to the computing device based, at least in part, on the comparison of colors reflected from the eye of the user matching the colors displayed by the touch screen and the received indication of the contact with the input keys.

11. The method of claim 10, further comprising determining a characteristic associated with a user in response to receiving the indication of the contact with the first input key of the plurality of input keys displayed on the touch screen, wherein the characteristic associated with the user corresponds to a lip movement of the user, an eye movement of the user, an orientation of an eye of the user, light reflected from a face or an eye of the user, a pupil size of the user, or a combination thereof, and wherein determining whether to enable access to the computing device is further based on the characteristic associated with the user and the indication of the contact with the first input key.

12. The method of claim 11, further comprising determining a second characteristic associated with the user in response to receiving the indication of the contact with the second input key of the plurality of input keys displayed in the second arrangement of the input key pattern, wherein determining whether to enable access to the computing device is further based on the second characteristic associated with the user and the indication of the contact with the second input key.

13. The method of claim 11, further comprising determining whether the second reflected color from the eye of the user matches the second color displayed by the touch screen in response to receiving the indication of the contact with the second input key of the plurality of input keys.

14. The method of claim 10, wherein the position of the one or more of the plurality of input keys is randomly changed to generate the second arrangement of the input key pattern of the plurality of input keys.

15. The method of claim 10, further comprising:
determining a first position on the touch screen that corresponds to a first gaze direction of the user in response to receiving the indication of the contact with the first input key of the plurality of input keys displayed on the touch screen;
determining whether the first position corresponds to a location of the first input key displayed on the touch screen;
determining a second position on the touch screen that corresponds to a second gaze direction of the user in response to receiving the indication of the contact with the second input key of the plurality of input keys displayed on the touch screen; and
determining whether the second position corresponds to a location of the second input key displayed on the touch screen.

16. The method of claim 10, wherein the input keys of the plurality of input keys are arranged in an input key pattern at a first location on the touch screen, and further comprising:
determining a characteristic associated with the user in response to receiving the indication of the contact with the first input key of the plurality of input keys displayed on the touch screen;
changing the first location of the input key pattern of the plurality of input keys to a second location on the touch screen after receiving the indication of the contact with the first input key; and
determining a second characteristic associated with the user in response to receiving the indication of the contact with the second input key of the plurality of input keys displayed at the second location.

17. The method of claim 10, wherein a first set of one or more of the plurality of input keys is displayed at a first location on the touch screen, wherein a second set of one or more of the plurality of input keys is displayed at a second location on the touch screen, and further comprising:
determining a characteristic associated with the user in response to receiving the indication of the contact with the first input key of the plurality of input keys displayed on the touch screen;
changing the locations of the first set and the second set to different locations on the touch screen after receiving the indication of the contact with the first input key; and
determining a second characteristic associated with the user in response to receiving an indication of contact with the second input key of the plurality of input keys.

18. The method of claim 10, wherein the plurality of input keys comprises the first input key and an ending input key, wherein the first input key is displayed at a first position and the ending input key is displayed at a second position on the touch screen, wherein a first swipe path is defined between the first input key and the ending input key, and further comprising determining a characteristic associated with the user in response to receiving an indication of contact with the ending input key.

19. A non-transitory computer-readable medium comprising instructions, the instructions, when executed by a processor, cause the processor to perform operations comprising:
displaying a plurality of input keys in a first arrangement of an input key pattern on a touch screen of a computing device, the touch screen displaying a first color;
comparing a first color of light reflected from an eye of a user to the first color displayed by the touch screen;
in response to receiving an indication of contact with a first input key, changing a position of one or more of the plurality of input keys to generate a second arrangement of the input key pattern of the plurality of input keys and changing the color displayed by the touch screen to a second color;
comparing a second color of light reflected from the eye of the user to the second color displayed by the touch screen after receiving an indication of contact with a second input key; and
determining whether to enable access to the computing device based, at least in part, on the comparison of colors reflected from the eye of the user matching the colors displayed by the touch screen and the received indication of the contact with the first input keys.

20. The non-transitory computer-readable medium of claim 19, further comprising determining a characteristic associated with the user in response to receiving the indication of the contact with the first input key of the plurality of input keys displayed on the touch screen, wherein the characteristic associated with the user corresponds to a lip movement of the user, an eye movement of the user, an orientation of an eye of the user, light reflected from a face or an eye of the user, a pupil size of the user, or a combination thereof, and wherein determining whether to enable access to the computing device is further based on the characteristic associated with the user and the indication of contact with the first input key.

21. The non-transitory computer-readable medium of claim 20, wherein the instructions further cause the processor to perform operations comprising determining a second characteristic associated with the user in response to receiving the indication of the contact with the second input key of the plurality of input keys displayed in the second arrangement of the input key pattern, and wherein determining whether to enable access to the computing device is further based on the second characteristic associated with the user and the indication of the contact with the second input key.

22. The non-transitory computer-readable medium of claim 20, wherein the instructions further cause the processor to perform operations comprising determining whether the second reflected color from the eye of the user matches the second color in response to receiving the indication of the contact with the second input key of the plurality of input keys.

23. The non-transitory computer-readable medium of claim 19, wherein the instructions further cause the processor to perform operations comprising randomly changing the position of the one or more of the plurality of input keys to generate the second arrangement of the input key pattern of the plurality of input keys.

24. The non-transitory computer-readable medium of claim 19, wherein the instructions further cause the processor to perform operations comprising:
- determine a first gaze direction of the user;
- determining a first position on the touch screen that corresponds to the first gaze direction of the user in response to receiving the indication of the contact with the first input key of the plurality of input keys displayed on the touch screen;
- determining whether the first position corresponds to a location of the first input key displayed on the touch screen;
- determining a second position on the touch screen that corresponds to a second gaze direction of the user in response to receiving an indication of contact with a second input key of the plurality of input keys displayed on the touch screen; and
- determining whether the second position corresponds to a location of the second input key displayed on the touch screen.

25. The non-transitory computer-readable medium of claim 19, wherein the input keys of the plurality of input keys are displayed in the input key pattern at a first location on the touch screen, and wherein the instructions further cause the processor to perform operations comprising:
- determining a characteristic associated with the user in response to receiving the indication of the contact with the first input key of the plurality of input keys displayed on the touch screen;
- changing the first location of the input key pattern of the plurality of input keys to a second location on the touch screen after receiving the indication of the contact with the first input key; and
- determining a second characteristic associated with the user in response to receiving the indication of the contact with the second input key of the plurality of input keys displayed at the second location.

26. The non-transitory computer-readable medium of claim 19, wherein a first set of one or more of the plurality of input keys is displayed at a first location on the touch screen, wherein a second set of one or more of the plurality of input keys is displayed at a second location on the touch screen, and wherein the instructions further cause the processor to perform operations comprising:
- determining a characteristic associated with the user in response to receiving the indication of the contact with the first input key of the plurality of input keys displayed on the touch screen;
- changing the locations of the first set and the second set to different locations on the touch screen after receiving the indication of the contact with the first input key; and
- determining a second characteristic associated with the user in response to receiving the indication of the contact with the second input key of the plurality of input keys.

27. The non-transitory computer-readable medium of claim 19, wherein the plurality of input keys comprises the first input key and an ending input key, wherein the first input key is displayed at a first position and the ending input key is displayed at a second position on the touch screen, wherein a first swipe path is defined between the first input key and the ending input key, and wherein the instructions further cause the processor to perform operations comprising determining a characteristic associated with the user in response to receiving an indication of contact with the ending input key.

28. An apparatus comprising:
- means for displaying a plurality of input keys in a first arrangement of an input key pattern on a touch screen of a computing device, wherein the means for displaying displays a first color;
- means for comparing a first color of light reflected from an eye of a user to the first color displayed by the touch screen;
- means for changing a position of one or more of the plurality of input keys to generate a second arrangement of the input key pattern of the plurality of input keys and changing the color displayed by the touch screen to a second color in response to receiving an indication of contact with a first input key;
- means for comparing a second color of light reflected from the eye of the user to the second color displayed by the touch screen after receiving an indication of contact with a second input key; and
- means for enabling access to a computing device based, at least in part, on the comparison of colors reflected from the eye of the user matching the colors displayed by the touch screen and the received indication of the contact with the input keys.

29. The apparatus of claim 28, further comprising means for determining a characteristic associated with the user in response to receiving the indication of the contact with the first input key of the plurality of input keys displayed on the means for displaying, wherein the characteristic associated with the user corresponds to a lip movement of the user, an eye movement of the user, an orientation of an eye of the user, light reflected from a face or an eye of the user, a pupil size of the user, or a combination thereof, and wherein the means for enabling is further configured to determine whether to enable access to the computing device based on the characteristic associated with the user and the indication of the contact with the first input key.

30. The apparatus of claim 29, further comprising:
- means for determining a characteristic associated with the user in response to receiving the indication of the contact with the first input key of the plurality of input keys displayed on the means for displaying; and
- means for determining a second characteristic associated with the user in response to receiving an indication of contact with a second input key of the plurality of input keys displayed in the second arrangement of the input key pattern, wherein the means for enabling is further configured to determine whether to enable access to the computing device based on the second characteristic associated with the user and the indication of the contact with the second input key.

* * * * *